Aug. 30, 1932.  D. R. TANNER  1,875,278
LUMBER MARKER
Filed Sept. 7, 1927  6 Sheets-Sheet 2
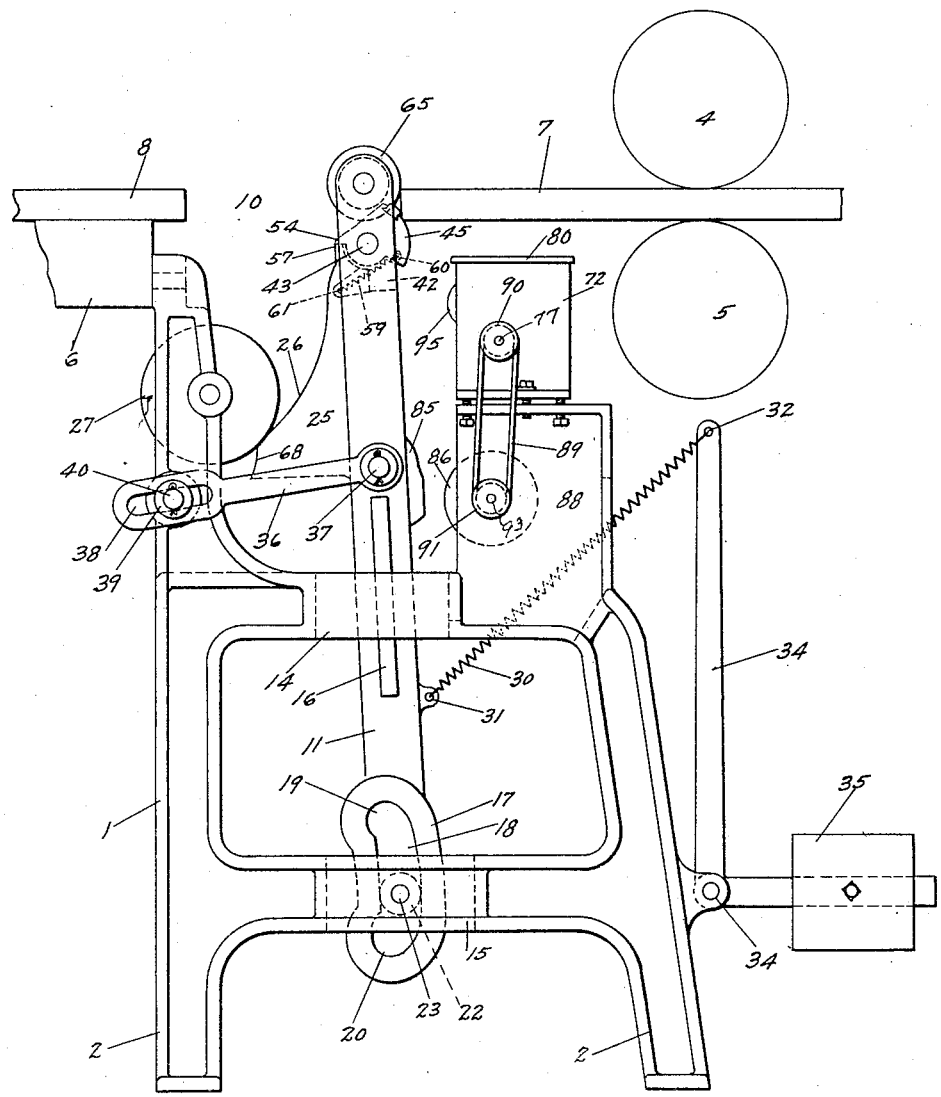
Fig. II
Inventor:
Daniel R. Tanner
By Atkins & Atkins,
Attorneys.

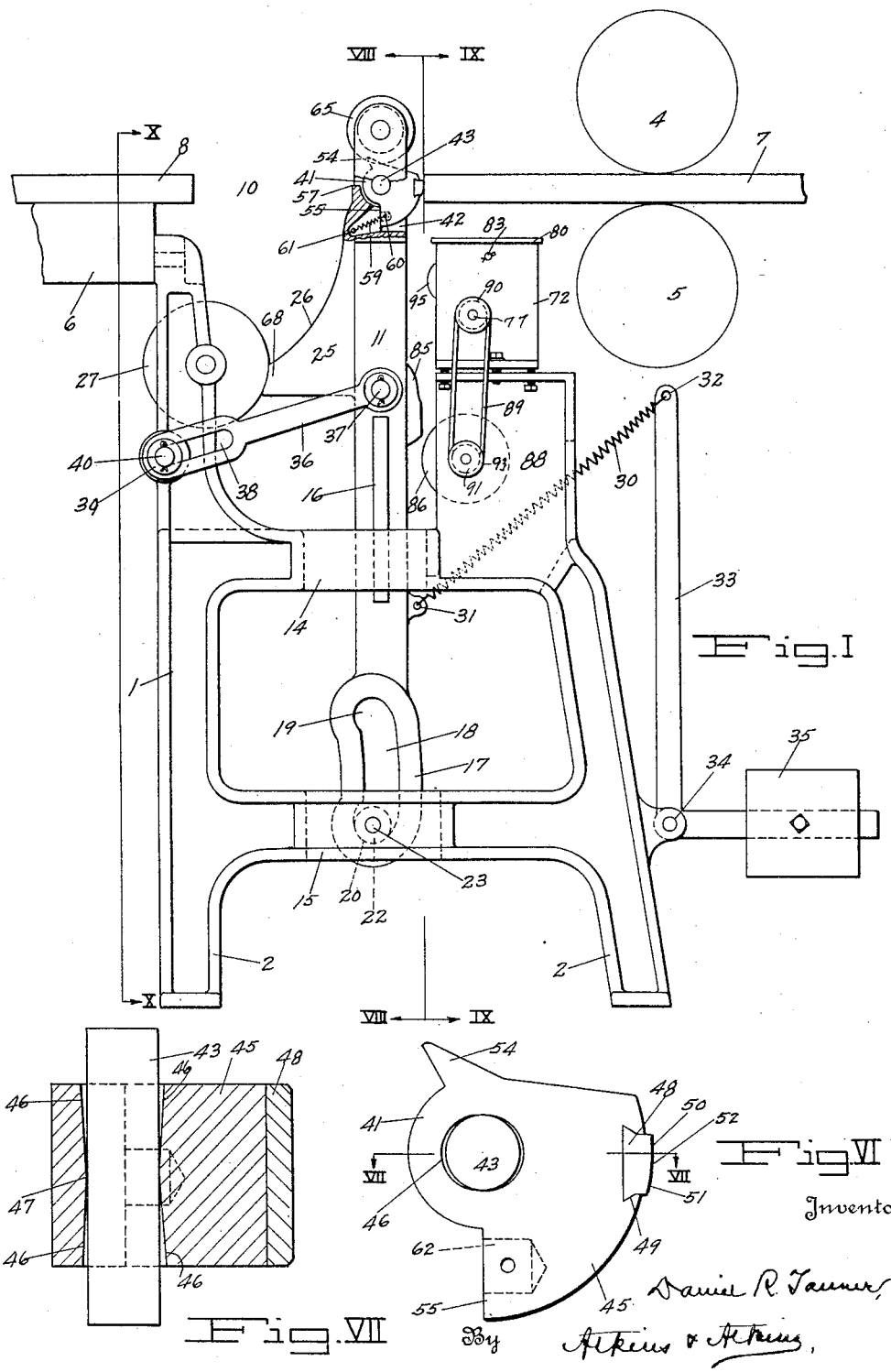

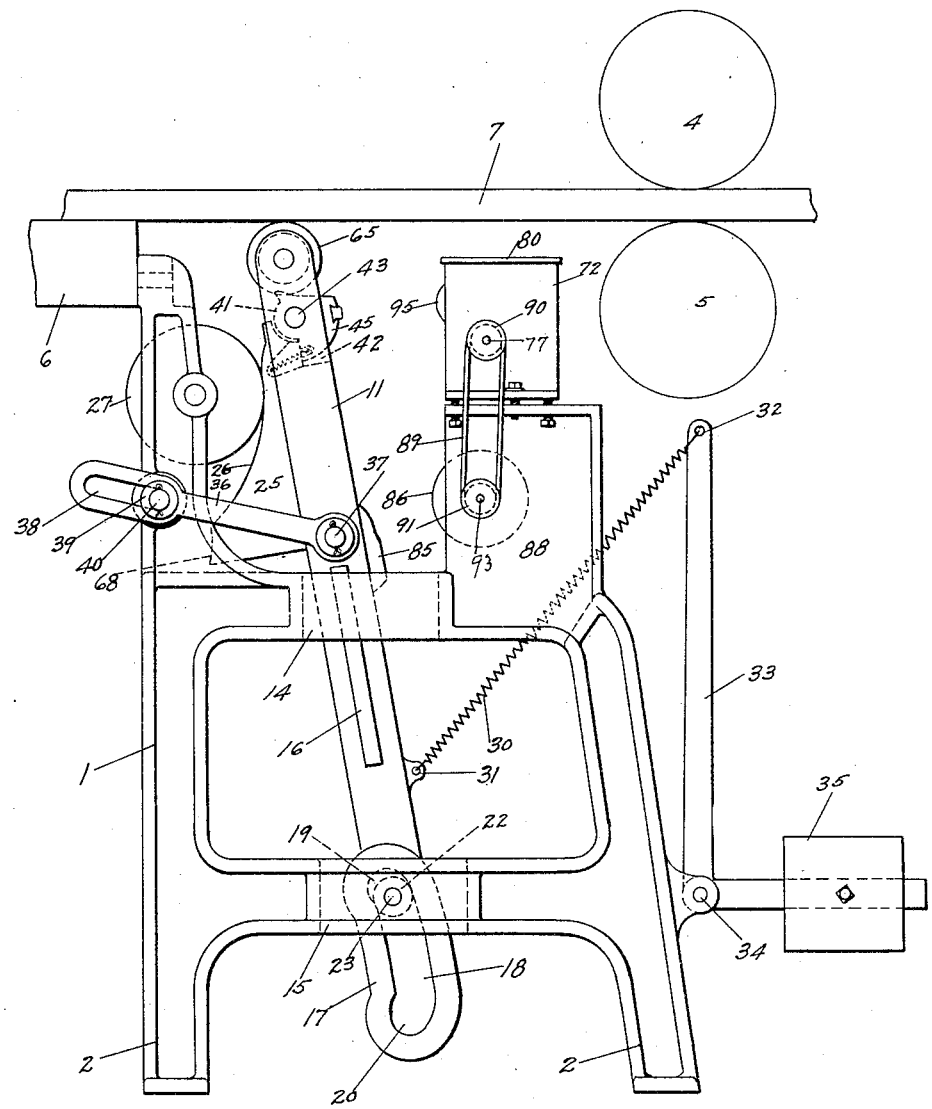
Fig. III

Aug. 30, 1932.　　　D. R. TANNER　　　1,875,278
LUMBER MARKER
Filed Sept. 7, 1927　　6 Sheets-Sheet 4
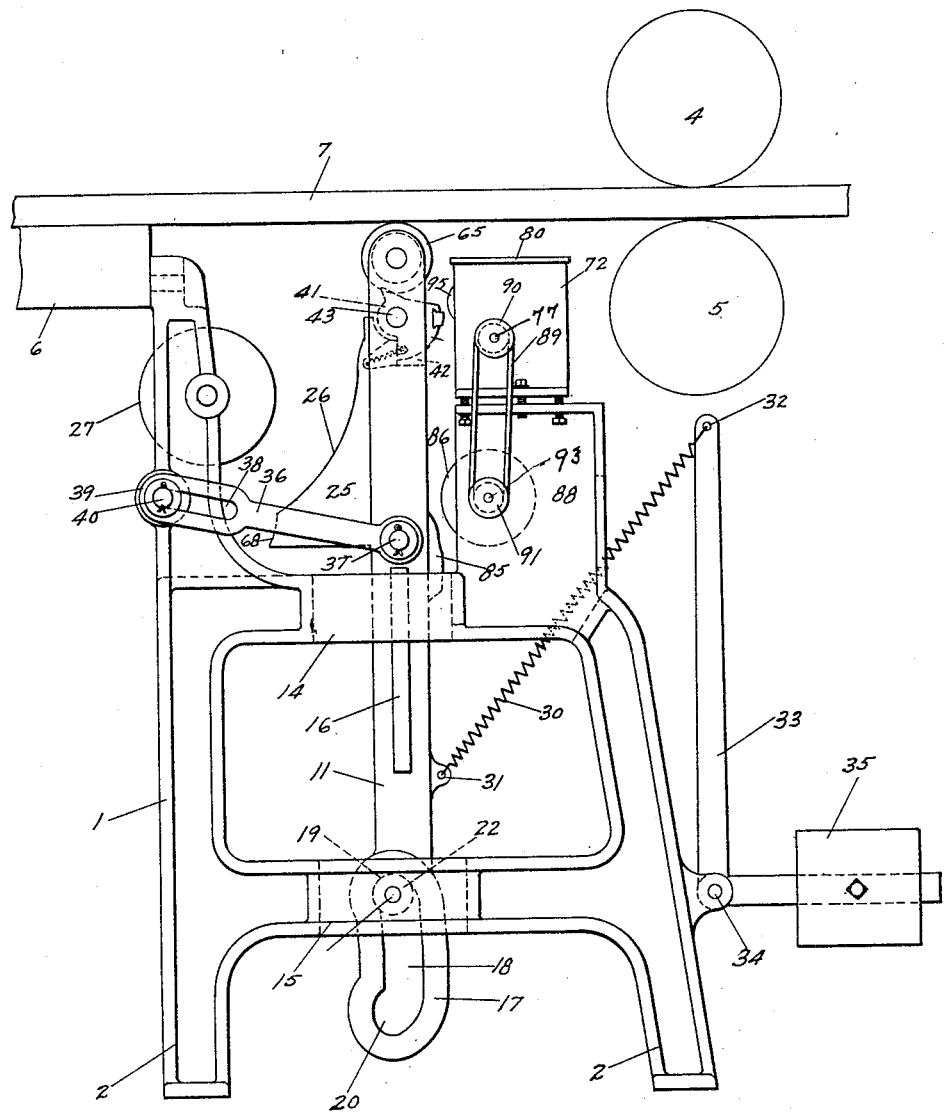
Fig. IV
Inventor:
Daniel R. Tanner,
By Atkins & Atkins,
Attorneys.

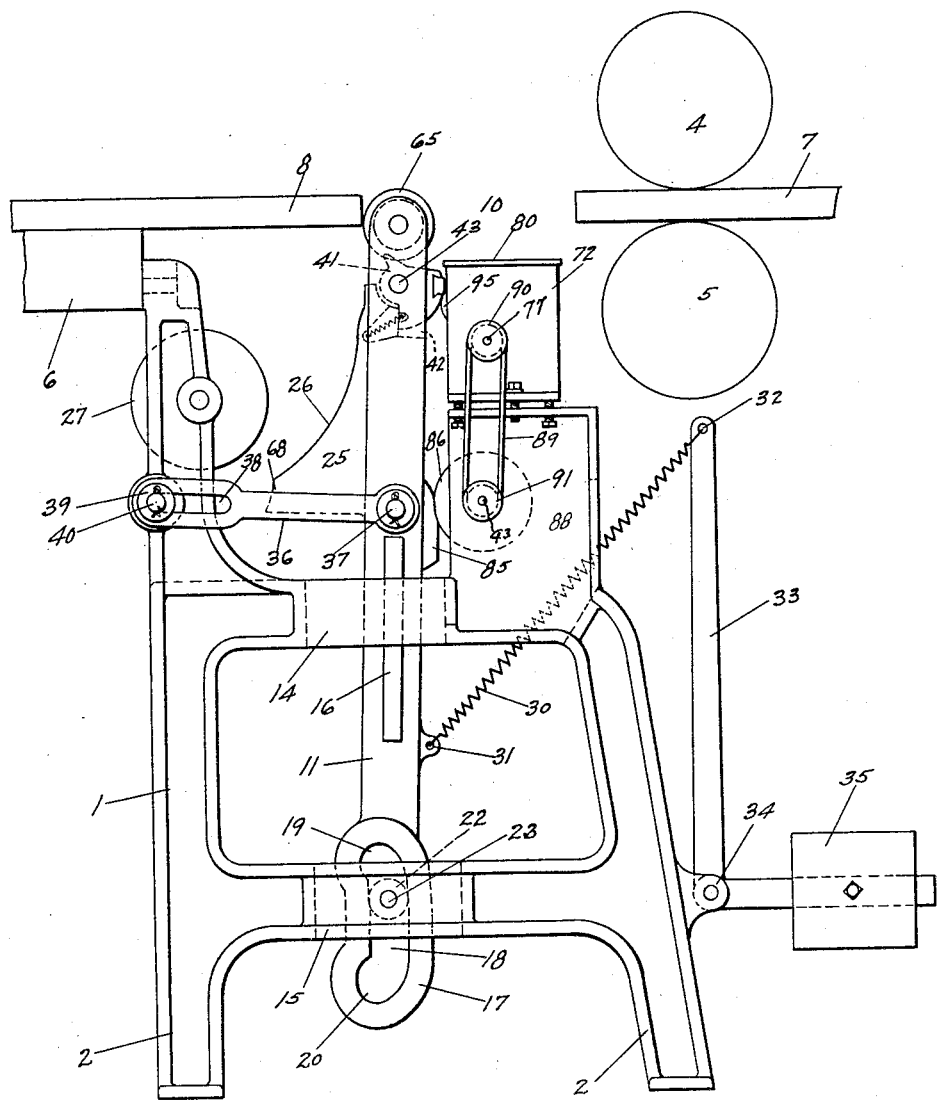
Fig. V

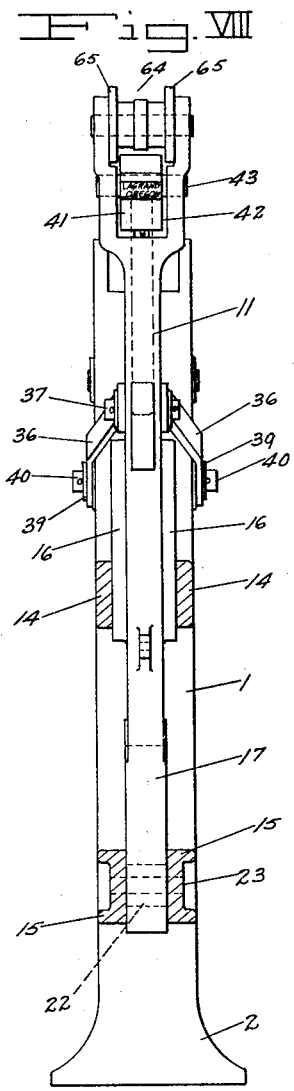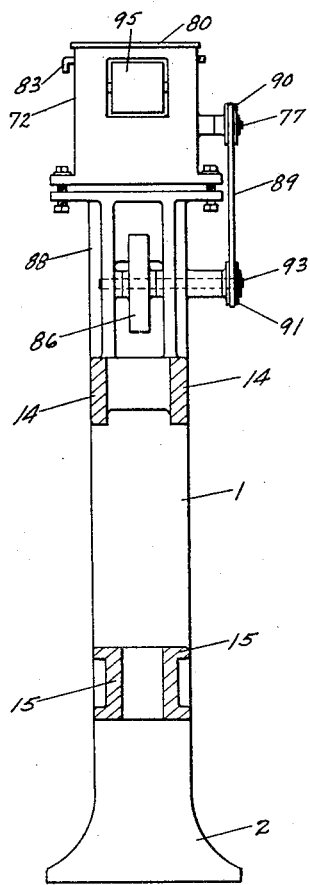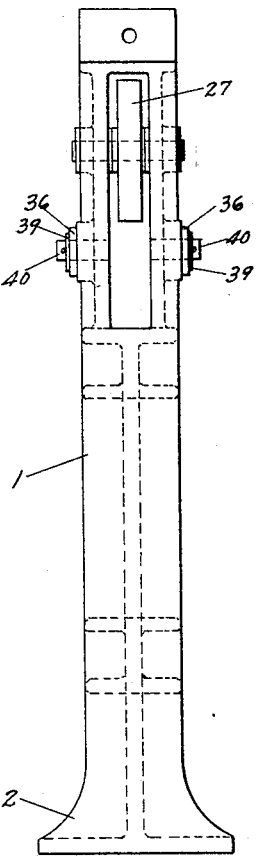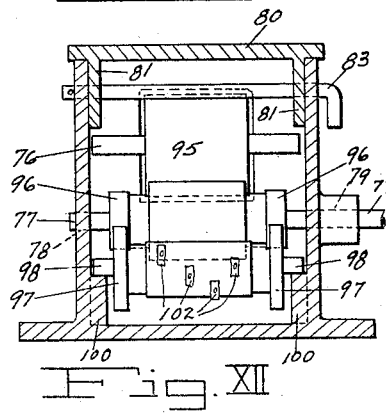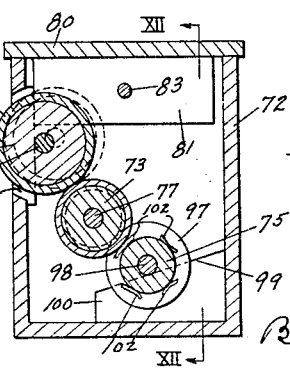

Patented Aug. 30, 1932

1,875,278

UNITED STATES PATENT OFFICE

DANIEL R. TANNER, OF LA GRANDE, OREGON

LUMBER MARKER

Application filed September 7, 1927. Serial No. 218,044.

My invention relates to machines for applying a mark of identification of any sort to lumber in the course of its manufacture, and has for its main object the production of novel means for affixing such a mark on lumber, stick by stick, or board by board.

Heretofore, in lumber markers the means employed for applying a mark has functioned through the instrumentality of a rolling or oscillating printing member, with the objectionable result that lack of uniformity in the marking ensues, and moreover, where ink is used in the making of the mark, the result has been not only to daub the lumber injuriously, but also to render the mark itself more or less obscure.

By my invention, the objectionable results aforesaid are eliminated by the employment of direct impact of the lumber against the marking element in each operation of applying the mark, and also by the employment, preferably, of inking mechanism which applies ink or pigment to the marking element with the cleanliness and certainty characteristic of good work in the art of printing.

What constitutes my invention will be hereinafter described in detail and succinctly defined in the appended claims.

In the accompanying drawings, wherein my invention is shown in present preferred form of embodiment, Figure I is a side elevation of my machine showing the parts thereof in the relative positions they assume substantially at the moment its operation of affixing a mark commences.

Figure II is a similar view showing the parts thereof in their relative positions immediately succeeding the completion of the marking operation.

Figure III is a similar view showing the parts thereof in the relative positions they assume after the marking operation and preparatory to assuming position for the operation of inking the marker.

Figure IV is a similar view showing the parts thereof in the final relative positions they assume in the cycle of operation of the machine immediately preceding the operation of inking the marker, and at the commencement of their return to their relative positions shown in Figure I.

Figure V is a similar view of my machine taken at the moment when the marking die has passed the inking roller and been inked thereby.

Figure VI is a detail side elevation of the marking die and its supporting pin detached.

Figure VII is a section on the line VII—VII of Figure VI.

Figure VIII is a vertical section on the line VIII—VIII of Figure I.

Figure IX is a vertical section of the subject matter of Figure I taken on the line IX—IX, and looking in the opposite direction from that in which Figure VIII looks.

Figure X is a vertical elevation on the line X—X of Figure I, looking in the direction of the arrows on said line.

Figure XI is a vertical section of the inking mechanism taken transversely to the axes of the inking rolls.

Figure XII is a vertical section taken at right angles to that shown in Figure XI on the line XII—XII of Figure XI.

Referring to the numerals on the drawings, 1 indicates by way of example, a frame which may be made of any suitable and preferred shape, size and dimensions. It is preferably made of cast metal, and provided with two feet 2, by which, in its installation for use, it may be firmly set as upon a mill floor.

Above the frame 1, in operative installation, is provided stock feeding mechanism preferably comprising a series of power driven rotative feed rolls, exemplified by a pair of rolls 4 and 5, between which pieces of stock to be marked are fed longitudinally at a determinate rate of speed, toward a receiving table 6, for which stock feed mechanism, not illustrated, is provided. Two pieces of stock are shown by way of exemplification of stock pieces which are fed in continuing endwise succession between the feed rolls 4 and 5, during the operation of the machine, and are identified by numerals 7 and 8 respectively.

The feed mechanism exemplified by the said rolls may be designated by the term stock feed mechanism, which requires no further description in this application than the statement that it is adapted to feed pieces of stock in such manner as to effect a gap or interval of separation of predeterminable extent between next succeeding pieces 7 and 8, for example. Specification of provision of the gap—indicated at 10—is deemed important, because the presence and length of the gap determine the disposition of the frame 1 relatively to the disposition thereto of the rolls 4 and 5, the said frame being located between the rolls 4 and 5 and the table 6 so as to operate within the gap 10 as and for the purpose hereinafter specified.

Assuming the frame 1 to be properly located, it is next in order to specify that the office of said frame is to operatively accommodate a reciprocatory marker-carrier 11. In that regard said marker-carrier works in suitable snug fitment in slots defined between pairs of cross pieces 14 and 15 on the frame 1. It is provided with lateral guide flanges 16 on its opposite sides as is well shown in Figure VIII that are disposed between the cross pieces 14, and with a slotted terminal cam head 17, having a thickness substantially equal, with the necessary clearance, to the width of the space between the cross pieces 15, within which the cam head works.

The curvilinear slot in the cam head 17, indicated by the numeral 18, terminates at its opposite ends, respectively, in cycloidal recesses or anchorage pockets 19 and 20 whose respective transverse axes are sufficiently disaligned from the curvilinear longitudinal medial line of the slot 18, in order to capacitate them to serve upon occasion as positive anchorages to a guide roller 22 which works within the slot 18 with guiding effect upon the cam head 17. The roller 22 is revolubly fixed upon a pin 23 having its opposite ends mounted in the respective cross pieces 15, it being obviously immaterial whether the pin is fixed to the roller 22 and rotates in the cross pieces 15, respectively, or whether the pin is fixed in the said cross pieces and the roller is rotative thereon.

The marker-carrier 11 is provided with suitable mechanism for directing its upward and downward movements in the frame 1. For that purpose, at a suitable measured distance above its cam head 17, it is provided with a longitudinally disposed snubbing member 25 preferably having a reentrant cam face 26. The transverse extent and the scope of said member 25 and its disposition on the carrier 11 are such as to enable it, when the free end of the carrier 11 is forced toward it, to engage the periphery of an antifriction guide wheel 27 that is revolubly mounted on the frame 1, with the consequent effect of compelling the downward movement aforesaid of the carrier, the extent of such movement being measured by the length of the slot 18, including its terminal pockets 19 and 20.

The carrier 11 is yieldingly urged towards a normal position which is substantially vertical as shown, for example, in Figure I. The means employed for actuating the carrier being variable at discretion may consist of a connecting member, preferably a contractile spring 30, fastened at one end 31 to the carrier and at the other end 32 to one arm of a bell crank lever 33 which is pivotally supported as upon a post 34 projecting from the frame 1. The other arm of the lever 33 carries adjustably on it a counterpoise 35 of sufficient weight.

Vibratory movement in either direction of the carrier 11 upon the roller 22 is limited, as by means of a pair of stop arms 36 that are pivotally united at one end to opposite sides of the carrier 11 as indicated at 37. At their ends opposite to that indicated at 37, each stop arm is provided with an oblong slot 38 whose sides ride upon a wheel 39, each revolubly fastened to one of two studs 40 which project in coaxial alignment from opposite sides of the frame 1. The slots 38 are of equal length, and limit the vibratory movement of the carrier 11.

The carrier 11 is provided with a marker or specifically a marking die 41 which is pivotally mounted in a cleft 42 in the upper end of the carrier 11 as on a supporting pin 43 carried in the sides of said cleft as shown in Figure VIII, for instance. A limited tilting movement of the marker 41 is provided for, in order that after it has performed its marking function on a stock-piece, it may, for protection of its printing face, tilt away from continued engagement with the end of the on-coming stock piece 7, as hereinafter described.

A preferred form of marking die 41 is shown in detail on enlarged scale in Figures VI and VII. As shown in the former figure, the die 41 comprises a segmentally disposed body 45 and a transverse bearing aperture 46 for reception of the pin 43. The aperture 46 is illustrated as of a slightly eliptical shape in cross section at its ends, it being provided, in effect, with a medially disposed constricted annular bearing ring 47 from which the aperture 46 flares slightly on two sides towards its opposite ends as illustrated in Figures VI and VII. The result is to afford for the die 41 a transversely rocking movement in consequence of its bearing on the pin 43, so that the printing face of the die may automatically adjust itself by a rocking movement in operative relationship to the plane at the end of a stock piece, at the moment of impact when they meet in printing contact, as shown in Figure I, an oncoming stock piece 7.

In diametrical relationship to the axis of the pin 43, as shown in Figure VI, I provide a printing plate 48 which is preferably made of hard metal inserted endwise into a transversely dovetailed channel 49 provided for it in the body 45 of the die 41. The plate 48 is provided preferably with two longitudinally disposed printing faces 50 and 51 whose sides meet substantially at an angle in a horizontal line of demarcation 52. The faces 50 and 51, although two in number, constitute in effect but a single printing face, because their combined effect is to make but one imprint. They are angularly disposed towards each other in order to produce a uniform imprint on the stock piece 7, for example. Otherwise, if the entire face of the printing plate 48 lay in one plane tangential to the curve of the body 45, the lower half of such a single plane printing face must injuriously dig into the wood in its printing action thereon. But by dividing the printing face into two planes meeting as in the line 52 parallel to the axis of the pin 43 the entire plate 48 does its work of printing uniformly and without defacement of the wood upon which imprint is made. The means last indicated constitutes a distinct advance in the art and one which is indispensible from a practical commercial point of view.

The die 41 is provided, as clearly shown in Figure VI, with stop-lugs 54 and 55, disposed, respectively in assemblage, on opposite sides of the pin 43. The lug 54 meets a stop piece 57, when the die 41 is uptilted as shown in Figure II. The die 41 is held in normal printing dispositions as by a tensile spring 59 fastened at its end 60 to the walls defining a cavity 62 in the die and at its end 61 to the carrier 11, as shown in Figure I, for instance.

The spring 59 yieldingly holds the lug 55 against the stop piece 57 when the die is in its normal position as shown in Figure I, and when it is forced out of that position, as shown in Figure II, the plate 48 retreats into an annular recess 64 whose cylindrical side walls constitute an antifriction roller 65, as will appear from comparison of Figures II and VIII, for instance.

The requisite actuation of the carrier 11 in the operation of the machine is effected by end thrust against its free end of each successive stock piece, indicated at 7, as it is advanced between the feed rolls 4 and 5, towards the receiving table 6, as indicated in its initial carrier-engaging position in Figure I. In that initial position the vertical end face of the oncoming stock-piece 7 first makes printing contact with the face 50 of the plate 48 as shown in said Figure I, the longitudinal medial horizontal plane of the piece 7 being coincident with the longitudinal axis of the pin 43, as shown in Figure VI, whereby the face is held rigidly in place with platen effect for performing the printing function demanded of it.

At the same time, the nose 68 of the snubbing member 25 abuts firmly against the guide wheel 27, so as to maintain, momentarily, the plate 48 rigidly in position for printing as just specified. When printing contact between the end of the stock-piece 7 and the face 50 of the marker or die 41 takes place, the result is the making of imprint of the one upon the other by positive, direct impact derived from the continued end-thrust of the stock-piece toward the printing face of the marker. Said impact, although but momentary, is important because upon the directness and positiveness of it in part depends the result achieved of a clear imprint of the face 50 of the die 41 on the end of the stock-piece. At the moment when such impact occurs, as has just been described, the carrier 11 is held rigidly in its vertical position both by coaction of the snubbing member 25 while in contact, as aforesaid, with the guide wheel 27, and by the positive though momentary anchorage of the roller 22 in the pocket 20.

The printing impact of the stock-piece against the face 50 of the die 41 as has just been described, is succeeded by the continued and uninterrupted advance of the stock-piece 7 which drives the carrier 11 before it first to the position illustrated in Figure II. In that position the advantage of making the marker or die 41 movable becomes apparent in that thereby the die is allowed to tilt upwardly towards the antifriction roller 65 and to retreat upon advance of the piece 7 with protective effect for the plate 48 into the annular recess 64 of said roller. The end-thrust of the stock-piece 7 is, on uptilt of the die, communicated mainly against the periphery of the said roller, instead of against the printing plate 48 of the die, which might, if the die 41 were not movable on the carrier, result in injury to said plate and also in a splitting or tearing action on the end of the stock-piece.

The driving of the carrier 11 before the stock-piece 7 causes the cam face 26 of the snubbing member 25 to ride upon the periphery of the wheel 27 with the result of disengaging the roller 22 from the pocket 20, and of causing relative guiding movement between said roller and the slot 18 of the cam head 17 to take place.

The further uninterrupted advance of the stock-piece 7 causes continuing depression of the carrier 11 until the stock piece, in its advance, comes to ride over the upper face of the roller 65, as illustrated in Figures III and IV. Engagement between the roller 65 and the underside of the stock-piece 7 holds the carrier 11 in substantially the same relative position until, by its further movement, the stock-piece clears the roller 65. Thereupon, the carrier 11 under tension of the counterpoise 35 or its equivalent, snaps from the position of it shown in Figure III to that position shown in Figure IV, and substantially without interruption of movement, ascends again through a new gap 10 presented by the advance of a new stock-piece 7, in spaced relationship to the stock-piece 8 which is only the preceding piece 7 in changed relationship, as has been heretofore specified. This completes the cycle of operation of the machine as described and is succeeded by a repetition thereof, in endless succession without interruption, so long as the machine continues in operation.

During the upward vertical movement of the carrier 11 from its position shown in Figure IV, the inking of the face of the marker is accomplished. In said inking, the die 41, restored by the spring 59 or its equivalent to normal position upon its pin 43, is caused by the ascent of the carrier 11 to take ink by the brushing of the face of the plate 48 against the inked face of an inking roll 70 that is operatively presented to the face of the plate 48 on the die 41 through an aperture 71 provided for it in an inkwell 72.

My inking mechanism may be varied at wise discretion, but that which I prefer to employ because of the simplicity it combines with efficiency, is shown as to details in Figures XI and XII, to which application of some of the numerals is confined, the incorporation of said mechanism in my machine being shown in Figures I and IV, for example.

My preferred form of inking mechanism comprises, in addition to the inkwell 72 and roller 70 already specified, an intermediate feed roller 73 designed and contrived so as to make operative ink-spreading contact, after the manner familiar in ordinary printing presses, with the surface of the roller 70 and with an ink supply roller 75 below it. The roller 75 is in use partly submerged in or in operative communication with a volume of any suitable liquid pigment, designated ink for convenient brevity, which is contained in the lower portion of the inkwell 72. The roller 70 is provided at its opposite ends with coaxial spacing studs 76, and the roller 73 is provided with a shaft 77 journalled in bearings 78 and 79 provided in the opposite side walls of the well 72, wherein the shaft 77 is revolubly fixed in place. A cover plate 80 is provided with depending flanges 81 which fit within the open upper end of the well 72 and are superposed above the spacing studs 76 of the roller 70 as shown in Figures XI and XII. A pin 83, penetrating suitable alined apertures provided for it in the flanges 81 and the contiguous side walls of the well 72, may be used to fasten the cover plate 80 in place upon the well 72.

An actuating strip 85 preferably disposed longitudinally on the carrier 11 extends into contactual driving relationship with a wheel 86 journalled in the opposite sides of case 88 provided for it on the frame 1, so as to impart, at intervals, rotation to the wheel 86. Said wheel is operatively connected to the roller 73, as by a flexible, preferably elastic, belt 89, and pulleys 90 and 91 on the shafts 77 and 93 of the roller 73 and the wheel 86, respectively.

The roller 70 is preferably provided with a cover 95 made of felt, for example, (see Figure XI) against which a hard face on the roller 73 makes operative inking contact. The roller 73 drives the roller 75 preferably by frictional engagement between wheels 96 provided at opposite ends of the roller 73 with wheels 97 provided at opposite ends of the roller 75. The roller 75 is provided with means for revolubly supporting it in operative inking contact with the roller 73. For that purpose, I prefer to make the roller 75 heavy enough to act by gravity, and to provide it with a coaxial terminally extended shaft 98 which rolls by gravity down inclined faces 99 on supporting plates 100 into operative contact with the roller 73, as will be understood from comparison of Figures XI and XII.

I prefer to provide, as shown in said figures, the roller 75 with absorbent wipers 102 which are arranged in staggered disposition about the periphery of said roller, having found that the employment of such wipers in such staggered relationship as to effect an unbroken transverse assemblage over the periphery of the roller 75 contributes to the success of the inking operation.

In view of the foregoing, the operation of the machine may be described, partly by way of recapitulation, as follows.

Assuming that the frame 1 is properly installed between the feed rolls 4 and 5 on one side and the receiving table 6 on the other side, and that the said rolls are, by suitable driving mechanism not illustrated, actuated in such manner as to drive successive stock-pieces, designated for example by the numeral 7, at desired rate of speed and with provision of suitable means for preserving the desired gap 10 or other space between the ends of stock-pieces 7 and 8, marking or printing of each successive stock piece 7 will ensue automatically in the manner described in the next following paragraph.

Each stock piece 7, advancing at a predetermined rate of speed, will find the carrier 11 disposed vertically within the gap across its line of travel, and will first encounter the face 50 of the marker 41, as shown in Figure I. Thereafter, in the manner heretofore specified, the advance of the piece 7 will result in operation of the several elements of the machine in the following order of sequence, namely, through engagement of the roller 22 and pocket 20, and by abutment of the nose 68 of the snubbing member 25 against the wheel 27, the carrier 11 will be anchored or held in rigid position coincidently with marking impact of the end of the piece 7 against the face 50 of the marker 41 held rigidly in position to receive said impact.

Next follows clearance by the piece 7 of the carrier 11, and its snapping back from the position it occupies in Figure III to that shown in Figure IV, and finally, the inking of the face of the die or marker 41 after said snapping back action of the carrier 11. The series of operations above enumerated completes a cycle of operations, and each cycle is repeated without interruption so long as the machine continues in operation.

The vertical movement in said cycle of the carrier 11 from the position in which it is shown in Figure IV, effects the operation of the inking of the face of the printing plate 48 of the die 41. In that operation the actuating strip 85 engages the face of the friction-driven wheel 86, which projects from its case 88 and imparts to the shaft 93 rotation, which in turn, by means of the belt 89 and the pulleys 90 and 91, imparts rotative movement to the inking roller 73. The rotation of the roller 73, through contact, respectively, with the face of the roller 70 and with the wipers 102 on the periphery of the roller 75 conveys ink from the bottom of the well 72 to and spreads it evenly over the face 95 of the roller 70. The continuing vertical movement of the carrier 11 brings the faces 50 and 51 of the plate 48 into inking contact with the yielding felt cover 95 of the roller 70, which contact is shown in Figure V as having been just completed. A final rise of the carrier 11 brings the plate 48 in the line of travel of the oncoming stock-piece 7 as shown in Figure I, when printing operation of the face of the plate 48 ensues in the manner already specified.

Thus it will appear that the inking operation last described is incidental to the completion of a cycle of motion of the carrier 11, up to the point of repetition as has already been described.

What I claim is:

1. In a lumber marker, the combination with a frame, a movable marker-carrier, a marking die mounted on said carrier, and means for imparting to said carrier oscillatory and vertical movements successively, of stock feeding mechanism in operative propinquity thereto, whereby pieces of stock may be by said mechanism fed successively into marking impact against said die.

2. In a lumber marker, the combination with a frame, a movable marker-carrier yieldingly actuated in one direction, a marking die mounted on said carrier, and means for imparting to said carrier oscillatory and vertical movements successively, of stock feeding mechanism in operative propinquity thereto, whereby pieces of stock may be, by said mechanism fed successively into marking impact against said die.

3. A marking die for a lumber marker consisting of a rocking member mounted on the marker provided with two plane printing faces meeting at an angle in a horizontal line of demarcation said die being movable on said line as an axis to effect a single imprint on the end of a piece of stock, by end thrust of said piece against it, substantially as and for the purpose specified.

In testimony whereof, I have hereunto set my hand.

DANIEL R. TANNER.